United States Patent
Phillips et al.

(10) Patent No.: US 8,187,545 B2
(45) Date of Patent: May 29, 2012

(54) HOURGLASS-SHAPED CAVITATION CHAMBER WITH SPHERICAL LOBES

(75) Inventors: Daniel A. Phillips, Grass Valley, CA (US); Ross Alan Tessien, Nevada City, CA (US); Richard D. Satterwhite, Grass Valley, CA (US)

(73) Assignee: Impulse Devices Inc., Grass Valley, CA (US)

( * ) Notice: Subject to any disclaimer, the term of this patent is extended or adjusted under 35 U.S.C. 154(b) by 905 days.

(21) Appl. No.: 11/149,714

(22) Filed: Jun. 9, 2005

(65) Prior Publication Data

US 2006/0269430 A1 Nov. 30, 2006

Related U.S. Application Data

(63) Continuation-in-part of application No. 11/140,175, filed on May 27, 2005, now abandoned.

(51) Int. Cl.
*B06B 1/00* (2006.01)
*A61L 2/00* (2006.01)
*B01F 11/00* (2006.01)

(52) U.S. Cl. .......... 422/127; 366/114; 366/127; 422/20; 422/128

(58) Field of Classification Search .................. 422/127, 422/20, 128; 366/114, 127; 367/157, 159
See application file for complete search history.

(56) References Cited

U.S. PATENT DOCUMENTS 3,891,869 A * 6/1975 Scarpa .......................... 310/325

(Continued)

FOREIGN PATENT DOCUMENTS

WO PCT/US95/15972 7/1996

(Continued)

OTHER PUBLICATIONS

Blake et al, Acoustic Cavitation:The Fluid Dynamics of Non-Spherical Bubbles, Phil. Trans. R. Soc. Lond. A, 1999, pp. 251-267, vol. 357, Publisher: The Royal Society, Published in: Great Britain.

(Continued)

*Primary Examiner* — Kevin Joyner
(74) *Attorney, Agent, or Firm* — Intrinsic Law Corp (57) ABSTRACT

An hourglass-shaped cavitation chamber is provided. The chamber is comprised of two large spherical regions separated by a smaller cylindrical region. Coupling the regions are two transitional sections which are preferably smooth and curved. Although the chamber is preferably fabricated from a machinable material, such as a metal, it can also be fabricated from a fragile material, such as a glass. An acoustic driver assembly is incorporated within the chamber wall at one end of the cavitation chamber. The driver can be threadably coupled to the chamber or attached using an epoxy, diffusion bonding, brazing or welding. O-rings or other seals can be used to seal the driver to the chamber. The head surface of the driver assembly can be flush, recessed, or extended from the internal chamber surface. The head surface of the driver assembly can be flat or shaped. If desired, a second acoustic driver assembly can be incorporated within the chamber wall at the other end of the cavitation chamber. Preferably the driver or drivers are attached such that their central axis is coaxial with the central axis of the cavitation chamber. Coupling conduits which can be used to fill/drain the chamber as well as couple the chamber to a degassing and/or circulatory system can be attached to one, or both, ends of the chamber. When used, preferably the conduit or conduits are attached off-axis.

16 Claims, 11 Drawing Sheets

U.S. PATENT DOCUMENTS

| | | | |
|---|---|---|---|
| 4,333,796 | A | 6/1982 | Flynn |
| 4,339,247 | A | 7/1982 | Faulkner et al. |
| 4,563,341 | A | 1/1986 | Flynn |
| 5,658,534 | A | 8/1997 | Desborough et al. |
| 5,659,173 | A | 8/1997 | Putterman et al. |
| 5,858,104 | A | 1/1999 | Clark |
| 5,969,207 | A * | 10/1999 | Kozyuk ......................... 422/127 |
| 5,998,908 | A | 12/1999 | Goodson |
| 6,361,747 | B1 | 3/2002 | Dion et al. |
| 6,555,011 | B1 * | 4/2003 | Tribelsky et al. ............. 210/748 |
| 2002/0090047 | A1 | 7/2002 | Stringham |

FOREIGN PATENT DOCUMENTS

| | | |
|---|---|---|
| WO | WO 0139200 A2 * | 5/2001 |
| WO | PCT/US02/16761 | 12/2002 |
| WO | PCT/CA03/00342 | 9/2003 |

OTHER PUBLICATIONS

M. Dan et al., Ambient Pressure Effect on Single-Bubble Sonoluminescence, Physical Review Letters, Aug. 30, 1999, pp. 1870-1873, vol. 83, No. 9, Publisher: The American Physical Society, Published in: US.

Moss et al., Computed Optical Emissions from a Sonoluminescing Bubble, Physical Review E, Mar. 1999, pp. 2986-2992, vol. 59, No. 3, Published in: US.

Gaitan et al, Experimental Observations of Bubble Response and Light Intensity Near the Threshold for Single Bubble Sonoluminescence, Physical Review E, May 1999, pp. 5495-5502, vol. 59, No. 5, Published in: US.

Barber et al, Sensitivity of Sonoluminescence to Experimental Parameters, Physical Review Letters, Feb. 28, 1994, pp. 1380-1382, vol. 72, No. 9.

Putterman, Sonoluminescence:Sound Into Light, Scientific American, Feb. 1995, pp. 46-51.

Gaitan et al, Sonoluminescence and Bubble Dynamics for a Single, Stable, Cavitation Bubble, J. Acoust. Soc. Am., Jun. 1992, pp. 3166-3183, vol. 91, No. 6, Publisher: Acoustical Society of America.

Crum, Sonoluminescence, Physics Today, Sep. 1994, pp. 22-29, Publisher: American Institute of Physics, Published in: US.

A. Chakravarty et al., Stable Sonoluminescence Within a Water Hammer Tube, Physical Review E, Jun. 24, 2004, pp. 1-8, vol. 69, No. 066317, Publisher: The American Physical Society, Published in: US.

Bollinger, Ultra Cavitation, http://wiretap.area.com/Gopher/Library/Article/Sci/cavitate.ult, Sep. 17, 2001, pp. 1-26.

* cited by examiner

HOURGLASS-SHAPED CAVITATION CHAMBER WITH SPHERICAL LOBES

REFERENCE TO RELATED APPLICATIONS

This application is a continuation of U.S. patent application Ser. No. 11/140,175, filed May 27, 2005 now abandoned.

FIELD OF THE INVENTION

The present invention relates generally to cavitation systems and, more particularly, to a shaped cavitation chamber.

BACKGROUND OF THE INVENTION

Sonoluminescence is a well-known phenomena discovered in the 1930's in which light is generated when a liquid is cavitated. Although a variety of techniques for cavitating the liquid are known (e.g., spark discharge, laser pulse, flowing the liquid through a Venturi tube), one of the most common techniques is through the application of high intensity sound waves.

In essence, the cavitation process consists of three stages; bubble formation, growth and subsequent collapse. The bubble or bubbles cavitated during this process absorb the applied energy, for example sound energy, and then release the energy in the form of light emission during an extremely brief period of time. The intensity of the generated light depends on a variety of factors including the physical properties of the liquid (e.g., density, surface tension, vapor pressure, chemical structure, temperature, hydrostatic pressure, etc.) and the applied energy (e.g., sound wave amplitude, sound wave frequency, etc.).

Although it is generally recognized that during the collapse of a cavitating bubble extremely high temperature plasmas are developed, leading to the observed sonoluminescence effect, many aspects of the phenomena have not yet been characterized. As such, the phenomena is at the heart of a considerable amount of research as scientists attempt to further characterize the phenomena (e.g., effects of pressure on the cavitating medium) as well as its many applications (e.g., sonochemistry, chemical detoxification, ultrasonic cleaning, etc.).

Acoustic drivers are commonly used to drive the cavitation process. For example, in an article entitled *Ambient Pressure Effect on Single-Bubble Sonoluminescence* by Dan et al. published in vol. 83, no. 9 of Physical Review Letters, the authors use a piezoelectric transducer to drive cavitation at the fundamental frequency of the cavitation chamber. They used this apparatus to study the effects of ambient pressure on bubble dynamics and single bubble sonoluminescence.

U.S. Pat. No. 4,333,796 discloses a cavitation chamber that is generally cylindrical although the inventors note that other shapes, such as spherical, can also be used. It is further disclosed that the chamber is comprised of a refractory metal such as tungsten, titanium, molybdenum, rhenium or some alloy thereof and the cavitation medium is a liquid metal such as lithium or an alloy thereof. Surrounding the cavitation chamber is a housing which is purportedly used as a neutron and tritium shield. Projecting through both the outer housing and the cavitation chamber walls are a number of acoustic horns, each of the acoustic horns being coupled to a transducer which supplies the mechanical energy to the associated horn.

U.S. Pat. No. 5,658,534 discloses a sonochemical apparatus consisting of a stainless steel tube about which ultrasonic transducers are affixed. The patent provides considerable detail as to the method of coupling the transducers to the tube. In particular, the patent discloses a transducer fixed to a cylindrical half-wavelength coupler by a stud, the coupler being clamped within a stainless steel collar welded to the outside of the sonochemical tube. The collars allow circulation of oil through the collar and an external heat exchanger. The abutting faces of the coupler and the transducer assembly are smooth and flat. The energy produced by the transducer passes through the coupler into the oil and then from the oil into the wall of the sonochemical tube.

U.S. Pat. No. 5,659,173 discloses a sonoluminescence system that uses a transparent spherical flask. The spherical flask is not described in detail, although the specification discloses that flasks of Pyrex®, Kontes®, and glass were used with sizes ranging from 10 milliliters to 5 liters. The drivers as well as a microphone piezoelectric were epoxied to the exterior surface of the chamber.

U.S. Pat. No. 5,858,104 discloses a shock wave chamber partially filled with a liquid. The remaining portion of the chamber is filled with gas which can be pressurized by a connected pressure source. Acoustic transducers mounted in the sidewalls of the chamber are used to position an object within the chamber while another transducer delivers a compressional acoustic shock wave into the liquid. A flexible membrane separating the liquid from the gas reflects the compressional shock wave as a dilatation wave focused on the location of the object about which a bubble is formed.

U.S. Pat. No. 6,361,747 discloses an acoustic cavitation reactor comprised of a flexible tube through which the liquid to be treated circulates. Electroacoustic transducers are radially and uniformly distributed around the tube, each of the electroacoustic transducers having a prismatic bar shape. As disclosed, the reactor tube may be comprised of a non-resonant material such as a resistant polymeric material (e.g., TFE, PTFE), with or without reinforcement (e.g., fiberglass, graphite fibers, mica).

PCT Application No. US02/16761 discloses a nuclear fusion reactor in which at least a portion of the liquid within the reactor is placed into a state of tension, this state of tension being less than the cavitation threshold of the liquid. In at least one disclosed embodiment, acoustic waves are used to pretension the liquid. After the desired state of tension is obtained, a cavitation initiation source, such as a neutron source, nucleates at least one bubble within the liquid, the bubble having a radius greater than a critical bubble radius. The nucleated bubbles are then imploded, the temperature generated by the implosion being sufficient to induce a nuclear fusion reaction.

PCT Application No. CA03/00342 discloses a nuclear fusion reactor in which a bubble of fusionable material is compressed using an acoustic pulse, the compression of the bubble providing the necessary energy to induce nuclear fusion. The nuclear fusion reactor is spherically shaped and filled with a liquid such as molten lithium or molten sodium. A pressure control system is used to maintain the liquid at the desired operating pressure. To form the desired acoustic pulse, a pneumatic-mechanical system is used in which a plurality of pistons associated with a plurality of air guns strike the outer surface of the reactor with sufficient force to form a shock wave within the liquid in the reactor. The application discloses releasing the bubble at the bottom of the chamber and applying the acoustic pulse as the bubble passes through the center of the reactor. A number of methods of determining when the bubble is approximately located at the center of the reactor are disclosed.

Avik Chakravarty et al., in a paper entitled *Stable Sonoluminescence Within a Water Hammer Tube* (Phys Rev E 69

(066317), Jun. 24, 2004), investigated the sonoluminescence effect using a water hammer tube rather than an acoustic resonator, thus allowing bubbles of greater size to be studied. The experimental apparatus employed by the authors included a sealed water hammer tube partially filled with the liquid under investigation. The water hammer tube was mounted vertically to the shaft of a moving coil vibrator. Cavitation was monitored both with a microphone and a photomultiplier tube.

SUMMARY OF THE INVENTION

The present invention provides an hourglass-shaped cavitation chamber for forming and imploding cavities. The chamber is comprised of two large spherical regions separated by a smaller cylindrical region. Coupling the regions are two transitional sections which are preferably smooth and curved. Although the chamber is preferably fabricated from a machinable material, such as a metal, it can also be fabricated from a fragile material, such as a glass. An acoustic driver assembly is incorporated within the chamber wall at one end of the cavitation chamber. The driver can be threadably coupled to the chamber or attached using an epoxy, diffusion bonding, brazing or welding. O-rings or other seals can be used to seal the driver to the chamber. The head surface of the driver assembly can be flush, recessed, or extended from the internal chamber surface. The head surface of the driver assembly can be flat or shaped. If desired, a second acoustic driver assembly can be incorporated within the chamber wall at the other end of the cavitation chamber. Preferably the driver or drivers are attached such that their central axis is coaxial with the central axis of the cavitation chamber. Coupling conduits which can be used to fill/drain the chamber as well as couple the chamber to a degassing and/or circulatory system can be attached to one, or both, ends of the chamber. When used, preferably the conduit or conduits are attached off-axis.

A further understanding of the nature and advantages of the present invention may be realized by reference to the remaining portions of the specification and the drawings.

DESCRIPTION OF THE SPECIFIC EMBODIMENTS

Figure 1:
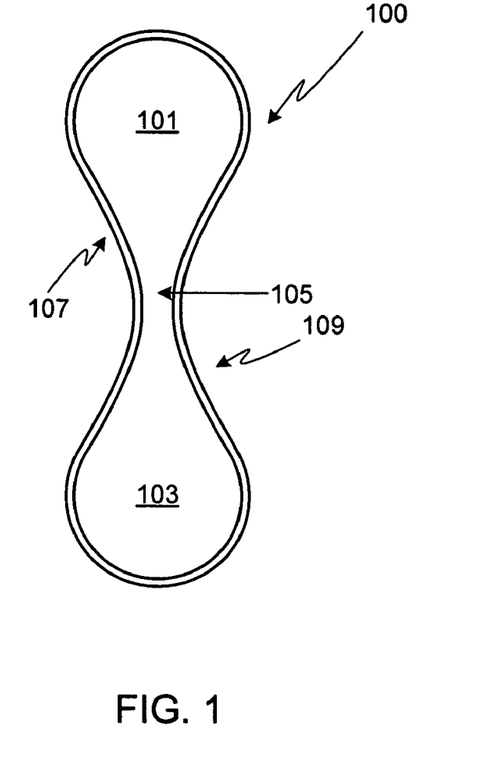
FIG. 1 is a cross-sectional view of the primary aspects of a cavitation chamber designed in accordance with the invention.
Figure 2:
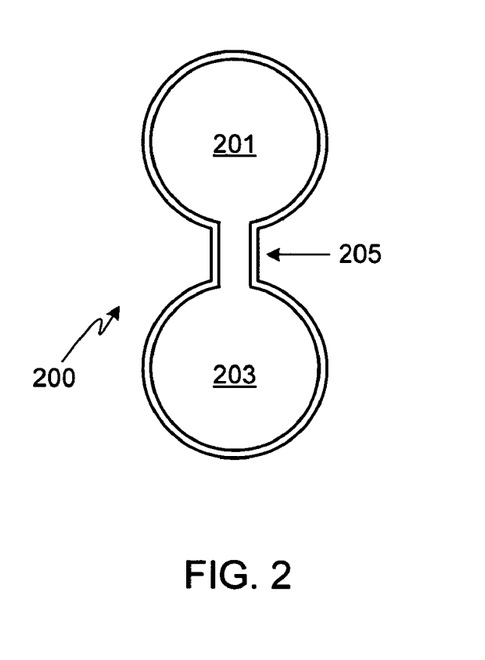
FIG. 2 is a cross-sectional view of an alternate hourglass-shaped cavitation chamber.

FIG. 1 is a cross-sectional view of the primary features of a cavitation chamber 100 designed in accordance with the invention. The chamber is comprised of two large spherical regions 101 and 103, separated by a smaller cylindrical region 105, regions 101 and 103 preferably being of the same dimensions. Coupling the regions are two transitional sections 107 and 109. The dimensions and curvatures of the transition regions are variable, depending upon the desired transition rate between the regions as well as the desired size of the openings between the two spherical regions and the interposed cylindrical region. For example, FIG. 2 illustrates a chamber 200 in which the spherical regions 201 and 203 have the same inner diameter as the corresponding regions of chamber 100, but in which the transition regions have been eliminated. As a result, chamber 200 is comprised only of the two spherical regions 201/203 and the interposed cylindrical region 205. Due to the spherical shape of the chamber's lobes, even without a transition region bubbles do not become trapped within the lower region.

Figure 3:
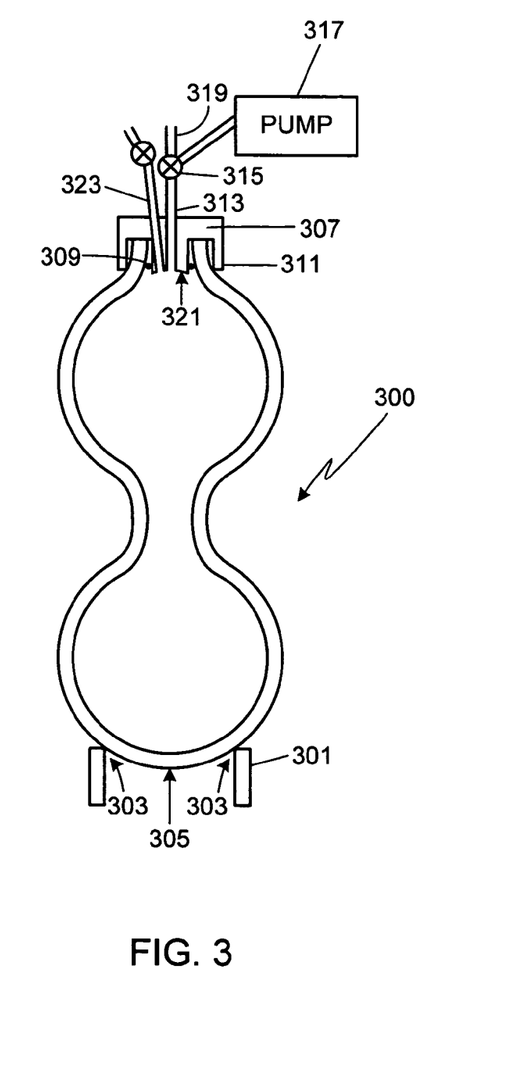
FIG. 3 is a cross-sectional view of an hourglass-shaped cavitation chamber with one open end, sealed with an end cap, utilizing a single ring-shaped acoustic driver.
Figure 4:
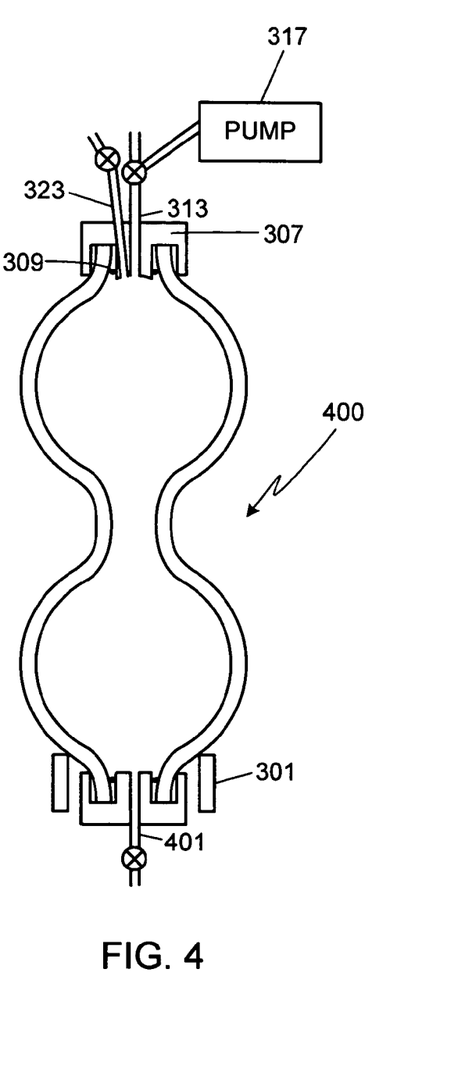
FIG. 4 is a cross-sectional view of an hourglass-shaped cavitation chamber with two open ends, each sealed with an end cap, utilizing a single ring-shaped acoustic driver.

FIGS. 3 and 4 illustrate embodiments of the invention in which an acoustic driver is coupled to one end of the hourglass-shaped chamber. Chamber 300 illustrated in the cross-sectional view of FIG. 3 is assumed to be fabricated from a relatively fragile material such as glass, borosilicate glass, or quartz. Due to the composition of chamber 300, acoustic driver 301 is bonded, preferably with an epoxy, to the base of the chamber along bond joint 303. Typically driver 301 is comprised of a ring of piezoelectric material, thus allowing a ring of contact to be achieved between the inner circumference of the piezoelectric ring, and the bottom surface 305 of chamber 300. If desired, surface 305 can be shaped (e.g., flattened) to provide improved contact area between the driver and the chamber.

At the upper end of chamber 300, assuming that the chamber is operated in a vertical configuration, is an end cap 307. End cap 307 can either be temporarily mounted to chamber 300, for example using o-rings 309 and a compression collar 311, or simply bonded in place, for example using an epoxy. End cap 307 includes at least one conduit (i.e., an inlet/outlet) 313 with a valve 315, conduit 313 allowing the chamber to be coupled, for example, to a degassing system or a cavitation circulatory system. In one embodiment valve 315 is a three-way valve which allows chamber 300 to be coupled either to pump 317 (e.g., for degassing purposes) or open to the atmosphere via conduit 319. Preferably inner surface 321 of end cap 307 is shaped, for example spherically shaped as shown, thus promoting the escape of bubbles from within the chamber and out of conduit 313. If desired, one or more additional conduits 323 can be included in end cap 307, thus simplifying fluid handling (e.g., chamber filling, fluid circulation, etc.).

FIG. 4 is an example of an hourglass chamber similar to that shown in FIG. 3, except for the addition of conduit 401 which passes through the opening in ring-shaped driver 301. Conduit 401 provides additional fluid handling flexibility, for example allowing the cavitation medium to be pumped through chamber 400 (e.g., entering conduit 401 and exiting conduit 313 or 323).

Figure 5:
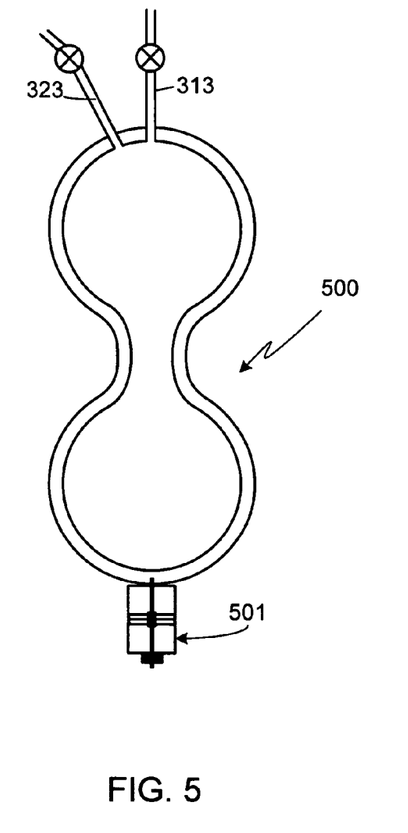
FIG. 5 is a cross-sectional view of an hourglass-shaped cavitation chamber fabricated from a machinable material with at least one conduit coupled to one chamber end and an acoustic driver attached to the other chamber end.
Figure 6:
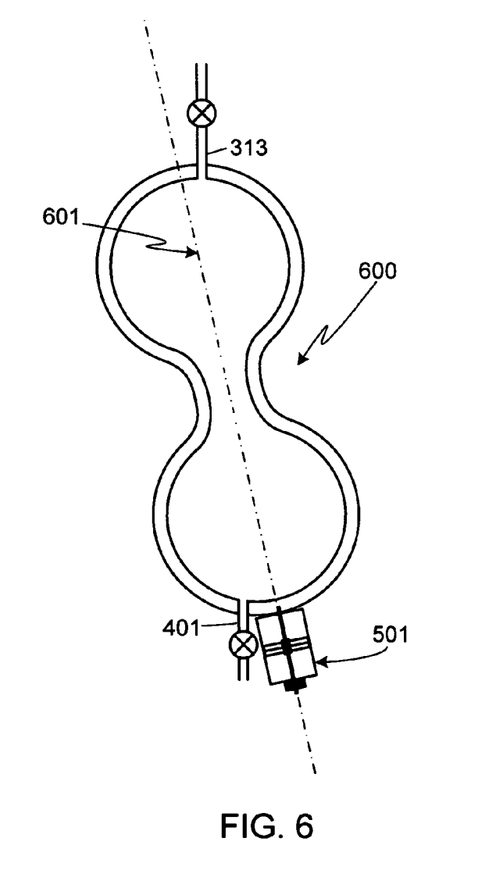
FIG. 6 is a cross-sectional view of an hourglass-shaped cavitation chamber fabricated from a machinable material with an acoustic driver attached to one chamber end and conduits coupled to both chamber ends.
Figure 7:
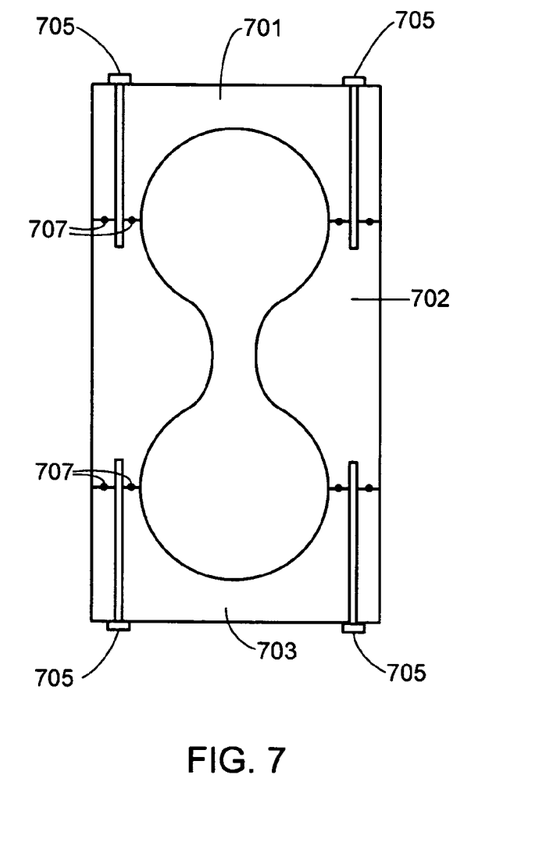
FIG. 7 is a cross-sectional view of a multi-section hourglass-shaped cavitation chamber.

FIGS. 5 and 6 correspond to FIGS. 3 and 4, respectively, with the chamber being fabricated from a machinable material (e.g., stainless steel). Chambers 500 and 600 can be fabricated from a single piece of material or from multiple pieces which are subsequently bonded, brazed, or welded together. Alternately, the chamber can be fabricated from multiple pieces (e.g., 701-703) which are held together with a plurality of bolts 705 and sealed with a plurality of o-rings/gaskets 707 as illustrated in FIG. 7.

Although driver 301 can be bonded to the base of either chamber 500 or 600 in a manner similar to that used with chambers 300 and 400, preferably a driver 501 is used, driver 501 being threadably coupled (e.g., bolted) directly to the chamber exterior wall. Alternately the head mass of driver 501 can be brazed, welded or bonded (e.g., epoxy bonded, diffusion bonded, etc.) to the exterior chamber surface. Suitable drivers and attachment techniques are disclosed in co-pending U.S. patent application Ser. No. 10/931,918 filed Sep. 1, 2004, Ser. No. 11/123,388 filed May 5, 2005, and Ser. No. 11/123,381 filed May 6, 2005, the disclosures of which are incorporated herein for any and all purposes. Due to the machinability of chambers 500 and 600, conduit 313 as well as any additional conduits (e.g., conduit 323) can be directly coupled to the chamber via a threaded coupling, brazing, welding or bonding. If a lower conduit (e.g., conduit 401) is attached to the chamber, a ring driver such as driver 301 can be used thus allowing the conduit to pass through the center of the driver as shown previously with chamber 400. Alternately, and as illustrated in FIG. 6, a driver such as driver 501 which does not include a central opening can be used. In this instance, however, either the driver, conduit 401, or both, must be attached off-axis. For example, as illustrated in FIG. 6, driver 501 is attached along the central axis 601 of chamber 600 while conduit 401 as well as primary upper conduit 313 are attached off-axis. Preferably during operation the chamber would be vertically aligned as shown, thus insuring that any bubbles formed during degassing and/or operation would easily escape the chamber. Mounting driver 501 along axis 601 helps to direct the energy from driver 501 along the chamber's central axis and toward region 105.

Figure 8:
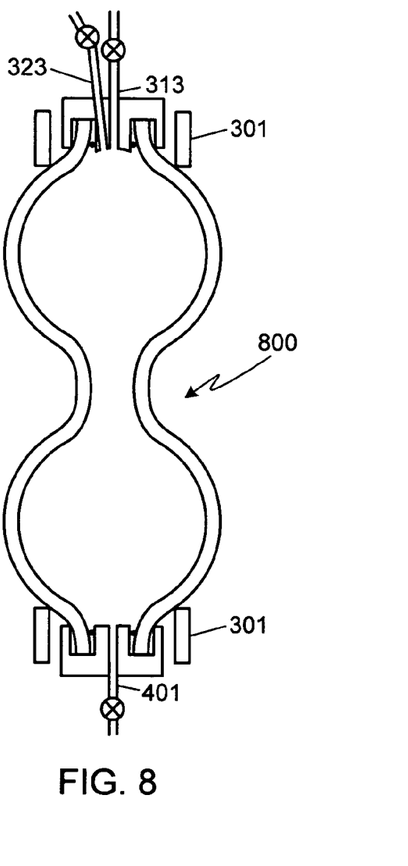
FIG. 8 is a cross-sectional view of an hourglass-shaped cavitation chamber similar to the chamber of FIG. 4, utilizing a pair of ring-shaped drivers.
Figure 9:
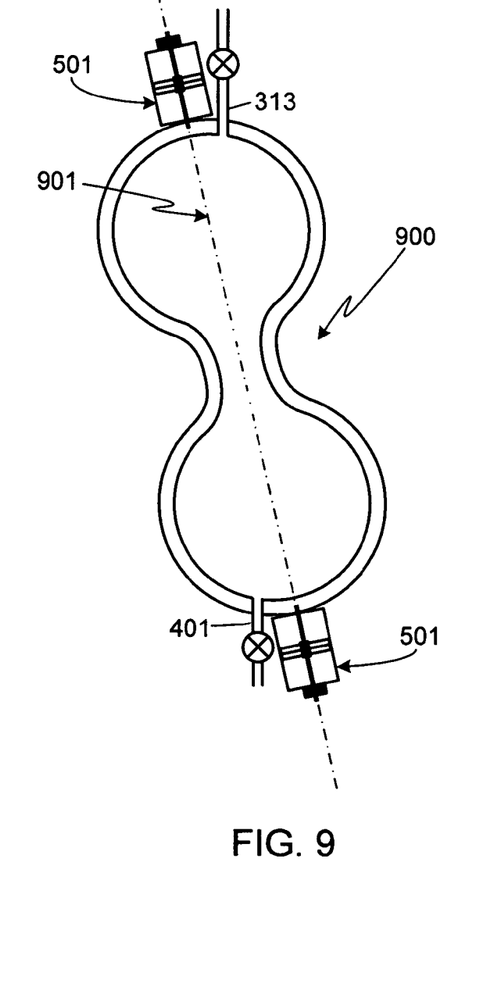
FIG. 9 is a cross-sectional view of an hourglass-shaped cavitation chamber similar to the chamber of FIG. 6, utilizing a pair of drivers.

FIGS. 8 and 9 illustrate two alternate embodiments of the invention, each of which utilize a pair of drivers. Chamber 800 can be fabricated from either a machinable (e.g., stainless steel) or non-machinable (e.g., glass) material as the drivers (e.g., drivers 301) are attached via bonding. The upper end cap used with chamber 800 is designed to not interfere with the driver. As opposed to a ring driver (e.g., driver 301), chamber 900 is designed to utilize a pair of drivers such as those disclosed in co-pending U.S. patent application Ser. No. 10/931,918 filed Sep. 1, 2004, Ser. No. 11/123,388 filed May 5, 2005, and Ser. No. 11/123,381 filed May 6, 2005. Such drivers (e.g., driver 501) are designed to be threadably coupled (e.g., bolted), brazed, welded or bonded (e.g., epoxy bonded, diffusion bonded, etc.) to the exterior chamber surface. Preferably the drivers are attached to chamber 900 along the centerline 901 of the chamber while the inlet/outlet conduits (e.g., conduit 313 and conduit 401, if used) are aligned off-axis. As shown, preferably during operation chamber 900 is aligned off-axis, thus insuring efficient removal of bubbles from the chamber.

Figure 10:
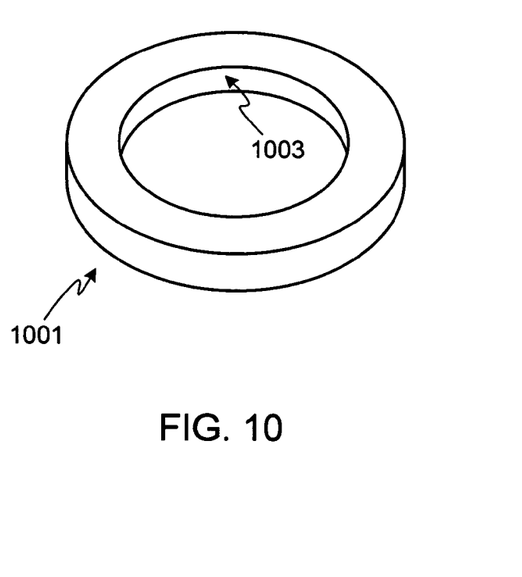
FIG. 10 is a perspective view of a ring-shaped driver.
Figure 11:
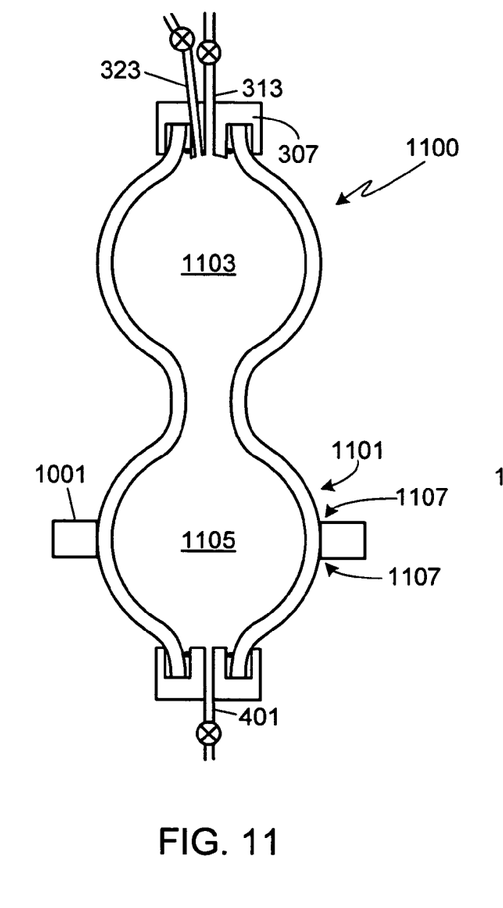
FIG. 11 is a cross-sectional view of an hourglass-shaped cavitation chamber similar to the chamber of FIG. 4, utilizing a single ring-shaped driver.
Figure 12:
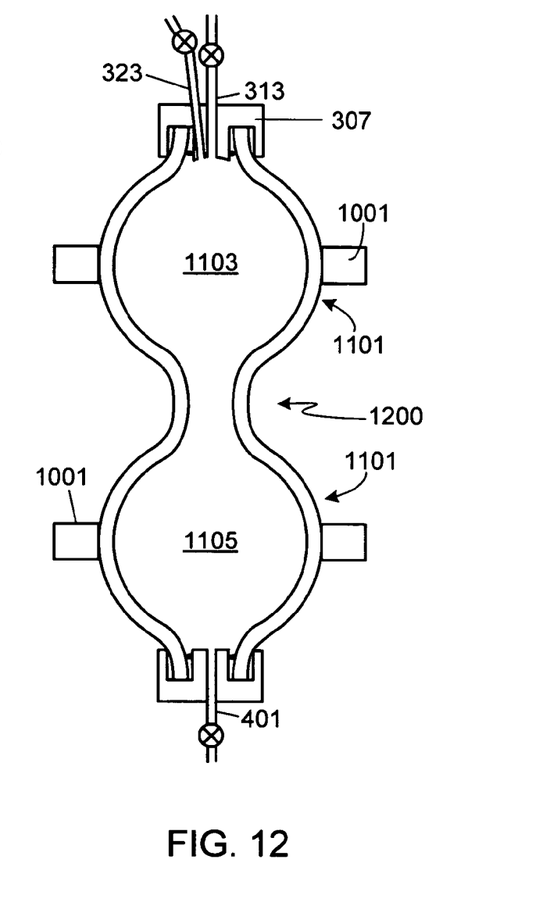
FIG. 12 is a cross-sectional view of an hourglass-shaped cavitation chamber similar to the chamber of FIG. 11, utilizing a pair of ring-shaped drivers.
Figure 13:
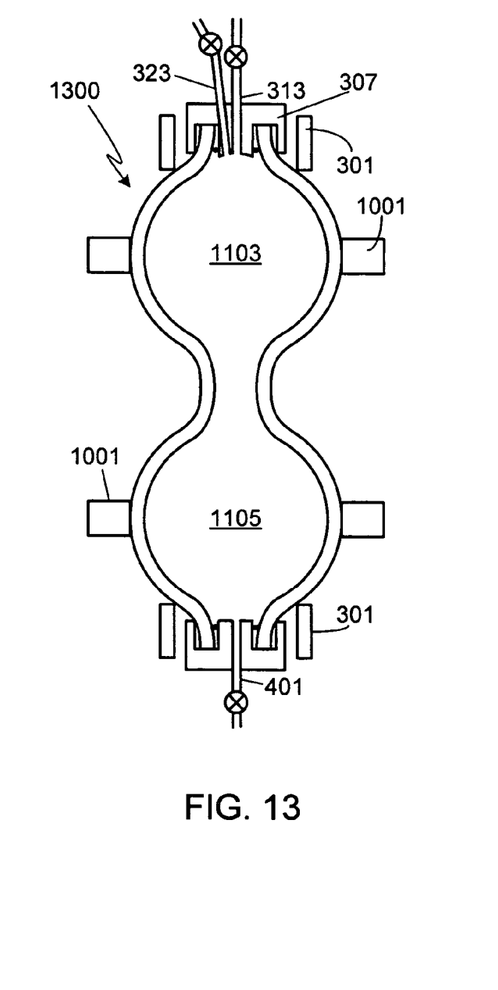
FIG. 13 is a cross-sectional view of an hourglass-shaped cavitation chamber similar to the chamber of FIG. 11, utilizing four ring-shaped drivers.
Figure 14:
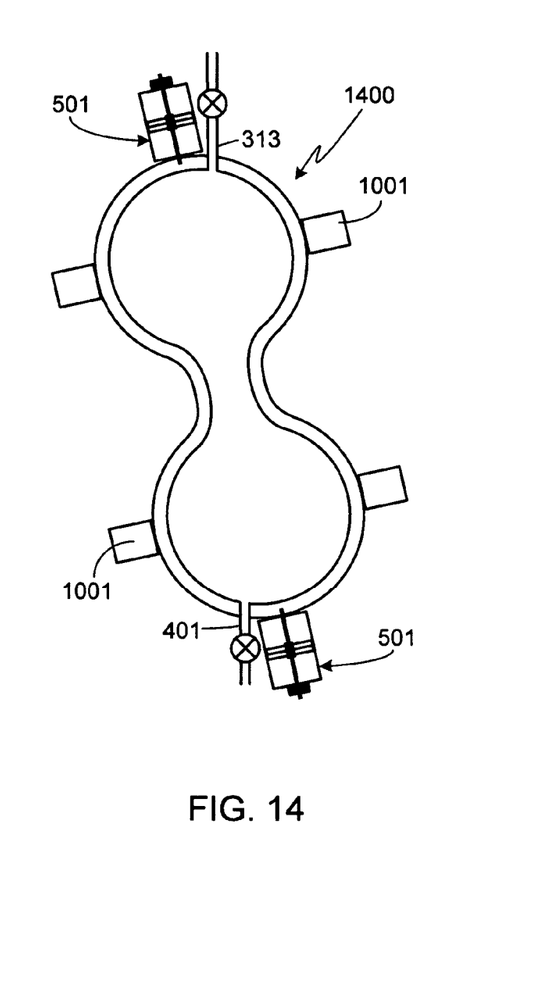
FIG. 14 is a cross-sectional view of an hourglass-shaped cavitation chamber similar to the chamber of FIG. 9, utilizing a pair of driver assemblies and a pair of ring-shaped drivers.

The hourglass cavitation chamber of the invention is not limited to the use of end region coupled acoustic drivers as illustrated in FIGS. 3-9. For example, ring-shaped acoustic drivers can be coupled to the circumference of one or both of the chamber's large spherical regions (e.g., regions 101 and 103 of FIG. 1). FIG. 10 is a perspective view of a suitable ring-shaped driver 1001. FIGS. 11-14 are cross-sectional views of embodiments of the invention utilizing ring-shaped driver 1001 attached to an hour-glass chamber. Preferably the internal surface 1003 of driver 1001 is designed to fit tightly against the outer surface 1101 of either, or both, upper region 1103 and lower region 1105 of the chamber. To improve communication of acoustic energy from the driver to the chamber, preferably ring-shaped driver 1001 is bonded to the chamber at bond line 1107, for example using an epoxy bonding agent. Chambers 1100-1400 can be fabricated from a machinable (e.g., stainless steel) or non-machinable (e.g., glass) material and may or may not include chamber inlets/outlets (e.g., conduits 323 and 401) in addition to conduit 313. For illustration purposes, FIG. 11 shows a single driver 1001 attached to lower region 1105 of a chamber 1100; FIG. 12 shows a pair of drivers 1001, one attached to upper region 1103 and one attached to lower region 1105 of a chamber 1200; FIG. 13 shows a pair of drivers 1001 and a pair of end drivers 301 attached to the upper and lower regions of a chamber 1300; and FIG. 14 shows a pair of drivers 1001 and a pair of end drivers 501 attached to the upper and lower regions of a chamber 1400. It will be appreciated that other combinations of drivers 1001, 301 and 501 can also be used with the hourglass-shaped chamber of the invention, for example using a single driver 1001 attached to the upper region 1103 of the chamber, or using a single ring-shaped driver 1001 in combination with a single end-surface driver 301 (or driver 501) with both drivers on the same chamber region or on opposite chamber regions, etc.

Figure 15:
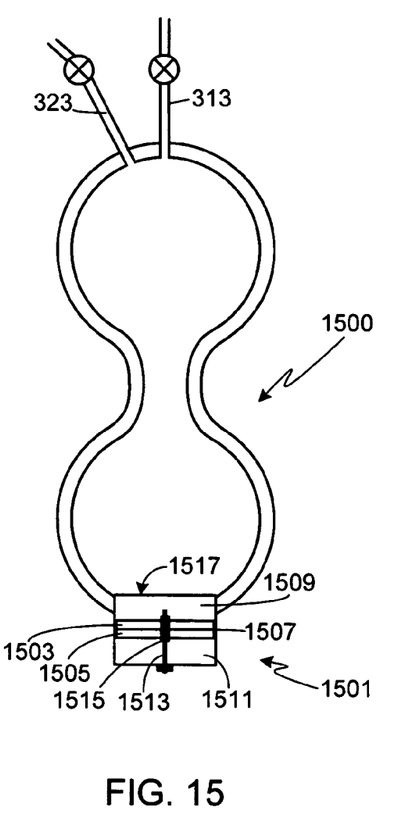
FIG. 15 is a cross-sectional view of an hourglass-shaped cavitation chamber in which an acoustic driver is incorporated within one chamber wall, placing the driver in contact with the cavitation medium.
Figure 16:
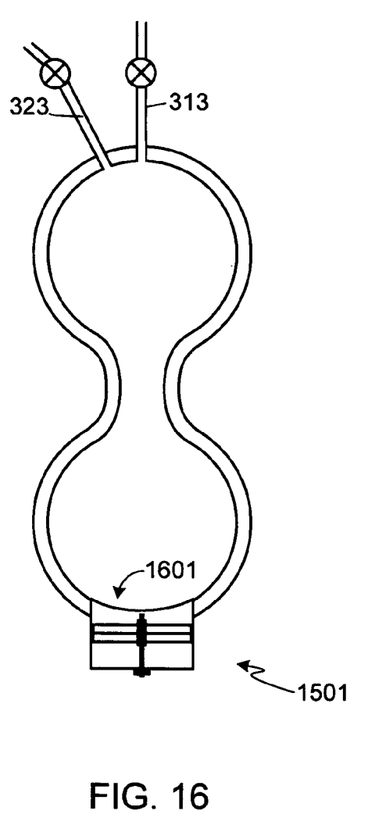
FIG. 16 is a cross-sectional view of an hourglass-shaped cavitation chamber similar to that of FIG. 15 in which the cavitation medium contacting surface of the driver is shaped.

The cavitation medium within the hourglass-shaped chamber can also be driven by placing driver, or at least a surface of a driver assembly, directly into contact with the cavitation medium. Such an approach provides improved coupling efficiency between the driver and the medium as the acoustic energy no longer must pass through a chamber wall. FIGS. 15 and 16 illustrate an embodiment of the invention in which a driver assembly 1501 is attached to a chamber 1500.

Driver assembly 1501 can use either piezo-electric or magnetostrictive transducers. Preferably driver assembly 1501 uses piezo-electric transducers, and more preferably a pair of piezo-electric transducer rings 1503 and 1505 poled in opposite directions. By using a pair of transducers in which the adjacent surfaces of the two crystals have the same polarity, potential grounding problems are minimized. An electrode disc 1507 is located between transducer rings 1503 and 1505 which, during operation, is coupled to a driver power amplifier (not shown).

The transducer pair is sandwiched between a head mass 1509 and a tail mass 1511. In the preferred embodiment both head mass 1509 and tail mass 1511 are fabricated from stainless steel and are of equal mass. In alternate embodiments head mass 1509 and tail mass 1511 are fabricated from different materials. In yet other alternate embodiments, head mass 1509 and tail mass 1511 have different masses and/or different mass diameters and/or different mass lengths. Preferably a bolt (or an all-thread and nut combination) 1513 is used to attach tail mass 1511 and the transducer(s) to head mass 1509. An insulating sleeve 1515 isolates bolt 1513, preventing it from shorting electrode 1507.

As illustrated in FIG. 15, the end surface 1517 of head mass 1509 is flush with the internal surface of chamber 1500. Alternately, end surface 1517 can either be recessed away from or extended into chamber 1500. Additionally, the end surface of the driver can be shaped, thus allowing the acoustic energy to be directed and focused. FIG. 16 illustrates an embodiment of the invention in which driver 1501 has a concave shaped end surface 1601.

Figure 17:
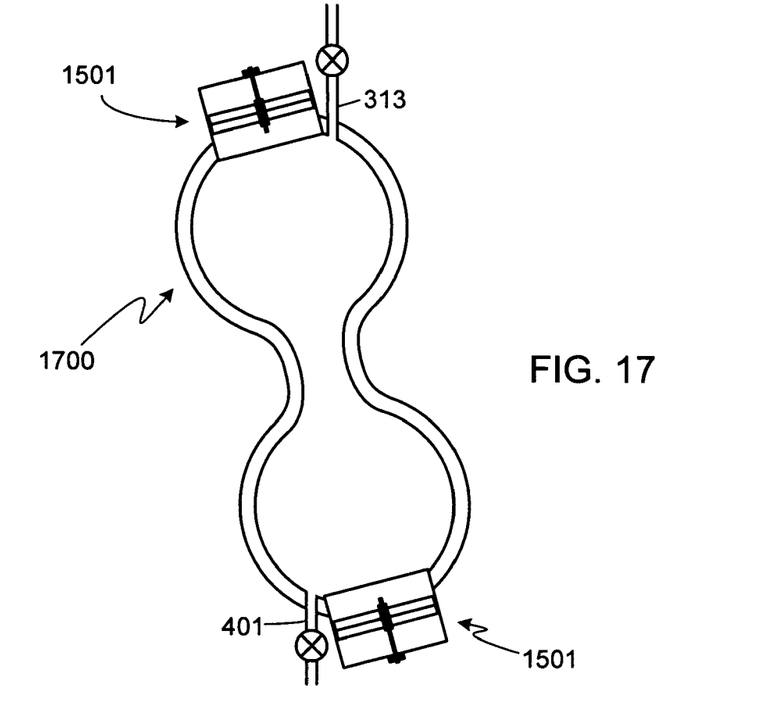
FIG. 17 is a cross-sectional view of an hourglass-shaped cavitation chamber in which a pair of acoustic drivers are incorporated within the chamber walls.

If desired, a pair of drivers 1501 can be mounted to a single chamber, one at either end. For example, FIG. 17 is a cross-sectional view of a chamber 1700 to which a pair of acoustic drivers is attached. As the preferred mounting position for each of the individual drivers is centered within the end surface of each end of the chamber, typically the chamber coupling conduits (e.g., conduit 313, 401, etc.) are mounted off-axis. As previously described, in order to achieve improved fluid flow into and out of the chamber, as well as efficient bubble removal, preferably during operation the chamber is mounted off-axis with conduit 313 attached to the uppermost portion of the chamber as shown.

Figure 18:
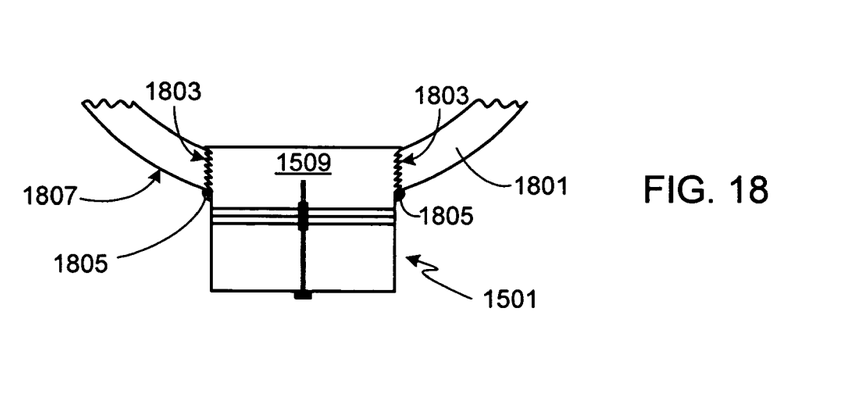
FIG. 18 illustrates a driver coupling technique for incorporating a driver within a chamber wall.
Figure 19:
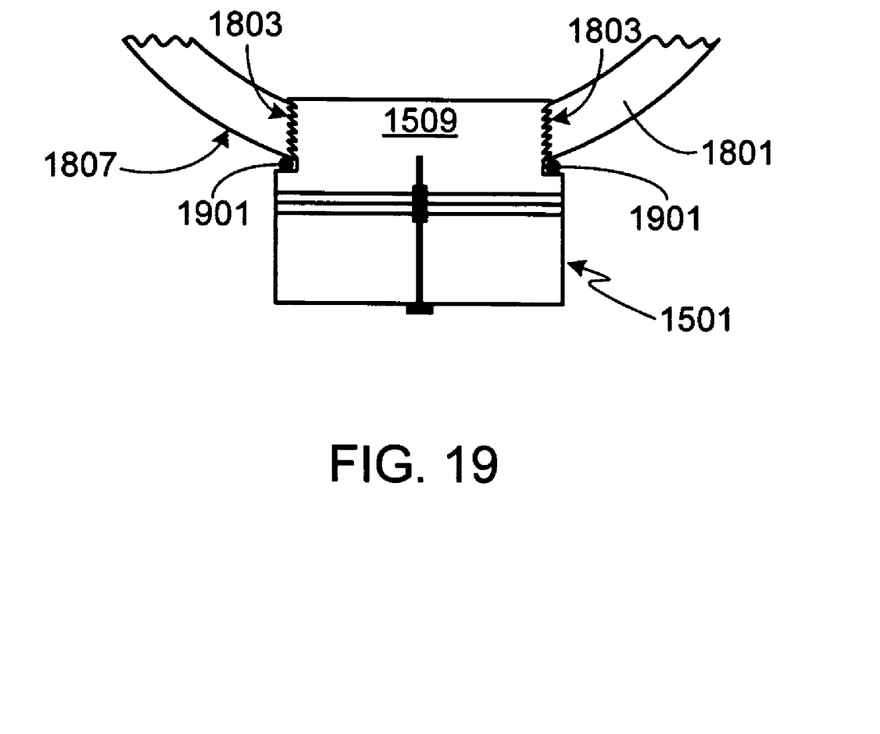
FIG. 19 illustrates an alternate driver coupling technique for incorporating a driver within a chamber wall.
Figure 20:
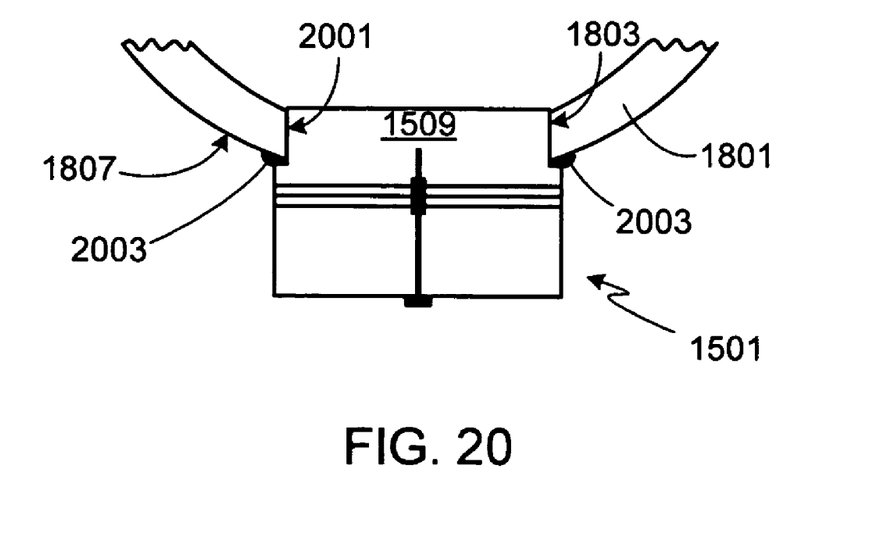
FIG. 20 illustrates an alternate driver coupling technique for incorporating a driver within a chamber wall.

Acoustic driver 1501 can be coupled to the hourglass-shaped chamber of the invention using any of a variety of techniques which allow the end surface of the head mass to be in direct contact with the cavitation fluid within the chamber. FIGS. 18-20 illustrate a few approaches that can be used to couple the driver to the chamber. It should be appreciated, however, that these are but a few preferred coupling techniques and the invention is not so limited. To simplify the figures, only a portion of the hourglass-shaped chamber is shown.

Assuming that the chamber is machinable, FIGS. 18 and 19 illustrate two driver coupling techniques in which head mass 1509 is threadably coupled to chamber wall 1801. In order to achieve an adequate seal, thus allowing high internal chamber pressures to be reached without incurring vapor or liquid leaks, preferably these embodiments also utilize a secondary seal. For example, a sealant or an epoxy can be interposed between the threads of the driver and those of the chamber, thus forming a seal 1803. Alternately, or in addition to seal 1803, a seal 1805 can be formed at the junction of external chamber surface 1807 and head mass 1509. Seal 1805 can be comprised of a sealant, an adhesive (e.g., epoxy), a braze joint or a weld joint. In the embodiment illustrated in FIG. 19, threading head mass 1509 into chamber wall 1801 compresses one or more o-ring/gasket seals 1901, thus achieving the desired driver seal. O-ring(s) 1901 can be used alone, or in combination with another seal such as seal 1803.

In the driver/chamber coupling assembly shown in FIG. 20, the exterior surface of head mass 1509 and the interior surface in which the driver fits are both smooth (i.e., no threads). In this embodiment the head mass is semi-permanently or permanently coupled to the chamber wall along joint 2001 and/or joint 2003. Depending upon the materials comprising the chamber and head mass, and thus the processes that can be used to couple the surfaces, the joint(s) may be comprised of a diffusion bond joint, a braze joint, a weld joint, or a bond joint.

In order to achieve the desired high intensity cavity implosions with the hourglass-shaped cavitation chamber of the invention, the cavitation medium must first be degassed. It should be understood that the present invention is not limited to a particular degassing technique, and the techniques described herein are for illustrative purposes only.

Figure 21:
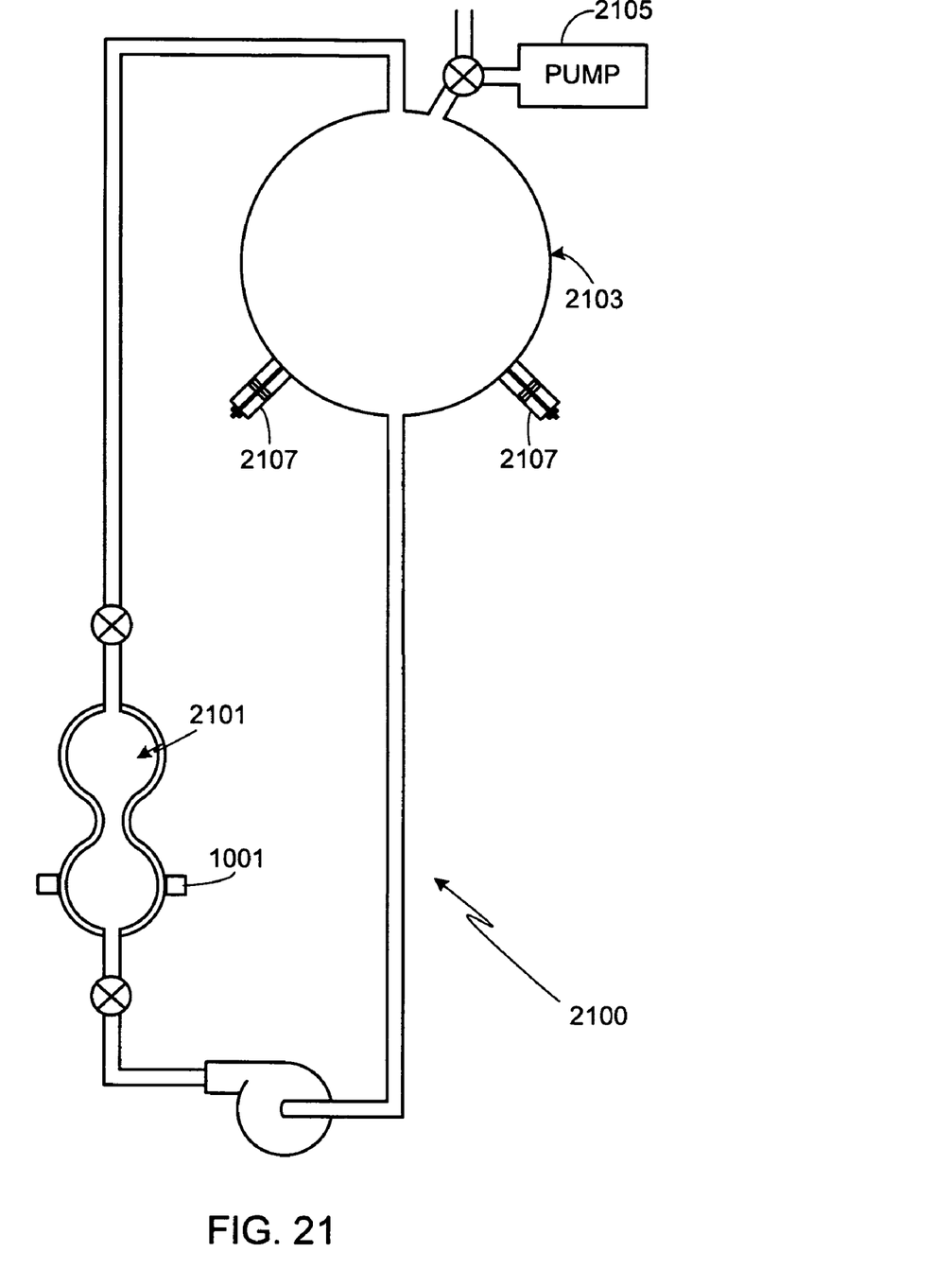
FIG. 21 illustrates an hourglass-shaped cavitation chamber coupled to a cavitation fluid degassing system.

In a preferred approach, the hourglass-shaped cavitation chamber (e.g., chamber 2101) is coupled to degassing system as that illustrated in FIG. 21, thus allowing the cavitation medium to be degassed prior to filling the cavitation chamber. Alternately, the cavitation medium within the chamber can be degassed directly, for example by coupling the chamber to a vacuum pump as shown in FIG. 3. Alternately, degassing can be performed in a separate, non-coupled chamber. Other components that may or may not be coupled to the degassing system include bubble traps, cavitation fluid filters, and heat exchange systems. Further description of some of these variations are provided in co-pending U.S. patent application Ser. No. 10/961,353, filed Oct. 7, 2004, and Ser. No. 11/001,720, filed Dec. 1, 2004, the disclosures of which are incorporated herein for any and all purposes.

Assuming the use of a separate degassing system 2100 as illustrated in FIG. 21, the first step in degassing the cavitation medium is to fill the degassing reservoir 2103 with cavitation fluid. In the illustrated example, the fluid within the reservoir is then degassed using vacuum pump 2105. The amount of time required during this step depends on the volume of reservoir 2103, the volume of cavitation fluid to be degassed and the capabilities of the vacuum system. Preferably vacuum pump 2105 evacuates reservoir 2103 until the pressure within the reservoir is close to the vapor pressure of the cavitation fluid, for example to a pressure of within 0.2 psi of the vapor pressure of the cavitation fluid or more preferably to a pressure of within 0.02 psi of the vapor pressure of the cavitation fluid. Typically this step of the degassing procedure is performed for at least 1 hour, preferably for at least 2 hours, more preferably for at least 4 hours, and still more preferably until the reservoir pressure is as close to the vapor pressure of the cavitation fluid as previously noted.

Once the fluid within reservoir 2103 is sufficiently degassed using vacuum pump 2105, preferably further degassing is performed by cavitating the fluid, the cavitation process tearing vacuum cavities within the cavitation fluid. As the newly formed cavities expand, gas from the fluid that remains after the initial degassing step enters into the cavities. During cavity collapse, however, not all of the gas re-enters the fluid. Accordingly a result of the cavitation process is the removal of dissolved gas from the cavitation fluid via rectified diffusion and the generation of bubbles.

Cavitation as a means of degassing the fluid can be performed within cavitation chamber 2101, degassing reservoir 2103, or a separate cavitation/degassing chamber (not shown). Furthermore, any of a variety of techniques can be used to cavitate the fluid. In a preferred embodiment of the invention, one or more acoustic drivers 2107 are coupled to degassing reservoir 2103. In an alternate preferred embodiment, an acoustic driver coupled to cavitation chamber 2101

(e.g., driver 1001 as shown, and/or driver 301 and/or driver 501 and/or driver 1501) is used during the degassing procedure. Acoustic drivers can be fabricated and mounted in accordance with the present specification or, for example, in accordance with co-pending U.S. patent application Ser. No. 10/931,918 filed Sep. 1, 2004, Ser. NO. 11/123,388 filed May 5, 2005, and Ser. No. 11/123,381 filed May 6, 2005, the disclosures of which are incorporated herein for any and all purposes. The operating frequency of the drivers depends on a variety of factors such as the sound speed of the liquid within the chamber, the shape/geometry of the chamber, the sound field geometry of the drivers, etc. In at least one embodiment the operating frequency is within the range of 1 kHz to 10 MHz. The selected frequency can be the resonant frequency of the chamber, an integer multiple of the resonant frequency, a non-integer multiple of the resonant frequency, or periodically altered during operation.

For high vapor pressure liquids, preferably prior to the above-identified cavitation step the use of the vacuum pump (e.g., pump 2105 or pump 317) is temporarily discontinued. Next the fluid within reservoir 2103 (or the hourglass-shaped chamber) is cavitated for a period of time, typically for at least 5 minutes and preferably for more than 30 minutes. The bubbles created during this step float to the top of the reservoir (or the chamber) due to their buoyancy. The gas removed from the fluid during this step is periodically removed from the reactor system, as desired, using vacuum pump 2105 (or vacuum pump 317). Typically the vacuum pump is only used after there has been a noticeable increase in pressure within the reservoir (or chamber), preferably an increase of at least 0.2 psi over the vapor pressure of the cavitation fluid, alternately an increase of at least 0.02 psi over the vapor pressure of the cavitation fluid, or alternately an increase of a couple of percent of the vapor pressure. Preferably the use of cavitation as a means of degassing the cavitation fluid is continued until the amount of dissolved gas within the cavitation fluid is so low that the fluid will no longer cavitate at the same cavitation driver power. Typically these cavitation/degassing steps are performed for at least 12 hours, preferably for at least 24 hours, more preferably for at least 36 hours, and still more preferably for at least 48 hours.

The above degassing procedure is sufficient for many applications, however in an alternate preferred embodiment of the invention another stage of degassing is performed. The first step of this additional degassing stage is to form cavities within the cavitation fluid. Although this step of degassing can be performed within degassing reservoir 2103, preferably it is performed within cavitation chamber 2101. The cavities are formed using any of a variety of means, including neutron bombardment, focusing a laser beam into the cavitation fluid to vaporize small amounts of fluid, by locally heating small regions with a hot wire, or by other means. Once one or more cavities are formed within the cavitation fluid, acoustic drivers (e.g., driver 1001) cause the cavitation of the newly formed cavities, resulting in the removal of additional dissolved gas within the fluid and the formation of bubbles. The bubbles, due to their buoyancy, drift to the top of the reservoir (or chamber) where the gas can be removed, when desired, using the vacuum pump. This stage of degassing can continue for either a preset time period (e.g., greater than 6 hours and preferably greater than 12 hours), or until the amount of dissolved gas being removed is negligible as evidenced by the pressure within the chamber remaining stable at the vapor pressure of the cavitation fluid for a preset time period (e.g., greater than 10 minutes, or greater than 30 minutes, or greater than 1 hour, etc.).

As will be understood by those familiar with the art, the present invention may be embodied in other specific forms without departing from the spirit or essential characteristics thereof. Accordingly, the disclosures and descriptions herein are intended to be illustrative, but not limiting, of the scope of the invention which is set forth in the following claims.

What is claimed is:
1. A cavitation system comprising:
 a cavitation chamber comprising:
  a first spherical region defined by a first inner diameter;
  a second spherical region defined by a second inner diameter; and
  a cylindrical region interposed between said first and second spherical regions, said cylindrical region coupling said first and second spherical regions, and said cylindrical region defined by a third inner diameter, wherein said third inner diameter is smaller than said first and second inner diameters; and
 an acoustic driver assembly incorporated within a first portion of a cavitation chamber wall, said first portion of said cavitation chamber wall corresponding to an end portion of said first spherical region of said cavitation chamber, wherein a head mass of said acoustic driver assembly protrudes through said first portion of said cavitation chamber wall, and wherein said acoustic driver assembly is configured to form and implode cavities within a cavitation fluid within said cavitation chamber, wherein a central axis corresponding to said acoustic driver assembly is coaxial with a central axis corresponding to said cavitation chamber, and wherein said central axis corresponding to said acoustic driver assembly extends through said cylindrical region.

2. The cavitation system of claim 1, wherein an end surface of said head mass is flush with an internal cavitation chamber surface.

3. The cavitation system of claim 1, wherein an end surface of said head mass is concave.

4. The cavitation system of claim 1, wherein at least a portion of said head mass is threaded, wherein said threaded head mass portion is threadably coupled to said first portion of said cavitation chamber wall.

5. The cavitation system of claim 1, further comprising a chamber inlet coupled to said end portion of said first spherical region of said cavitation chamber.

6. The cavitation system of claim 5, wherein said chamber inlet couples said cavitation chamber to a cavitation fluid circulatory system.

7. The cavitation system of claim 1, further comprising a chamber inlet coupled to an end portion of said second spherical region of said cavitation chamber.

8. The cavitation system of claim 7, wherein said chamber inlet couples said cavitation chamber to a cavitation fluid circulatory system.

9. The cavitation system of claim 1, further comprising a second acoustic driver assembly incorporated within a second portion of said cavitation chamber wall, said second portion of said cavitation chamber wall corresponding to an end portion of said second spherical region of said cavitation chamber, wherein a head mass of said second acoustic driver assembly protrudes through said second portion of said cavitation chamber wall.

10. The cavitation system of claim 9, wherein a central axis corresponding to said second acoustic driver assembly is coaxial with a central axis corresponding to said cavitation chamber.

11. The cavitation system of claim 1, further comprising a second acoustic driver assembly incorporated within a second portion of said cavitation chamber wall, said second portion of said cavitation chamber wall corresponding to an end portion of said second spherical region of said cavitation chamber, wherein a head mass of said second acoustic driver assembly protrudes through said second portion of said cavitation chamber wall, wherein a central axis corresponding to said second acoustic driver assembly is coaxial with said central axis corresponding to said cavitation chamber.

12. The cavitation system of claim 1, wherein said cavitation chamber is fabricated from a machinable material.

13. The cavitation system of claim 1, wherein said cavitation chamber is fabricated from a metal.

14. The cavitation system of claim 1, wherein said first and second inner diameters are approximately equal.

15. The cavitation system of claim 1, further comprising a first curved transition region coupling said first spherical region to said third cylindrical region and a second curved transition region coupling said second spherical region to said third cylindrical region.

16. A cavitation system comprising:
a cavitation chamber comprising:
   a first spherical region defined by a first inner diameter;
   a second spherical region defined by a second inner diameter; and
   a cylindrical region interposed between said first and second spherical regions, said cylindrical region coupling said first and second spherical regions, and said cylindrical region defined by a third inner diameter, wherein said third inner diameter is smaller than said first and second inner diameters; and
an acoustic driver assembly incorporated within a first portion of a cavitation chamber wall, said first portion of said cavitation chamber wall corresponding to an end portion of said first spherical region of said cavitation chamber, wherein a head mass of said acoustic driver assembly protrudes through said first portion of said cavitation chamber wall, and wherein said acoustic driver assembly is configured to form and implode cavities within a cavitation fluid within said cavitation chamber, wherein a central axis corresponding to said driver assembly extends through said cylindrical region.

* * * * *